May 11, 1926.
E. CLIFTON
TREE SUPPORT
Filed May 21, 1925
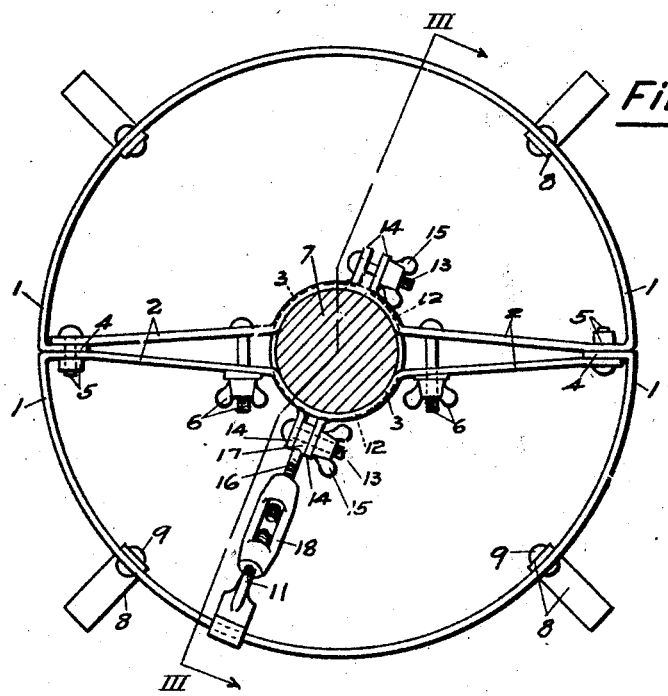
Fig. I.
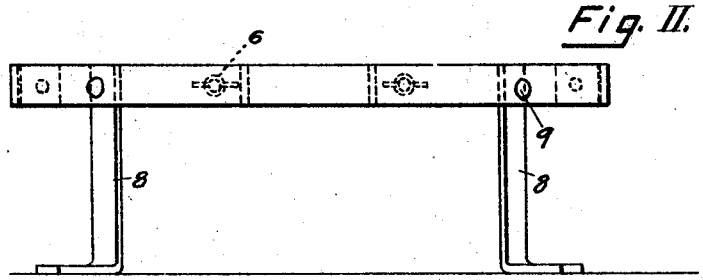
Fig. II.
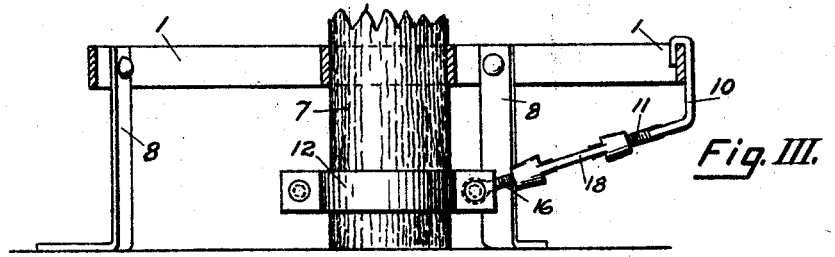
Fig. III.
Inventor,
ENOCH CLIFTON.
By R.C. Wright.
Attorney.

Patented May 11, 1926.

1,584,011

UNITED STATES PATENT OFFICE.

ENOCH CLIFTON, OF PORTLAND, OREGON.

TREE SUPPORT.

Application filed May 21, 1925. Serial No. 31,847.

My invention relates to supports or holders for detached trees as a class.

The object of my invention is to provide such a support or holder especially for Christmas trees but for detached trees used for ornament upon any occasion. The device is arranged in two like members adjustable to the tree stem and with an adjustable guy mechanism to straighten or plumb the stem. I attain these objects by the construction, combination and arrangement of parts illustrated in the accompanying drawings which form a part hereof.

Fig. I is a top plan view of the device with a tree stem in section shown in position therein.

Fig. II is a side elevation of the device.

Fig. III is a sectional view of the device on the line III—III in Fig. I.

Like characters refer to like parts in the views.

There are two like semi-circular members 1. A strap 2 extends from one end of the member to the opposing end of the member. The strap 2 has a curved clamping part 3 in its center, adapted to engage a tree stem. The opposite end of the member has an inwardly angled part 4. Bolts 5 are provided to secure the parts 4 to the ends of the straps 2. Also bolts 6 to secure the curved strap parts 3 together into engagement with a tree stem 7. The members 1 are supported by vertical legs 8, which are secured to the members by rivets 9 passing through the members and the legs near the upper ends of the latter. The guy mechanism consists of an angled bracket, clamp and tightening means. The bracket 10 is slidably positioned upon the upper rim of a member 1. The bracket has a threaded rod 11 on its lower part. The clamp is composed of two arched members 12 arranged to be placed about the tree stem to engage it between them. Bolts 13 pass through the parallel opposing ends 14 of the clamp members 12 and have wing nuts 15 to draw them together on the bolts. A threaded rod 16 has a head 17 provided with an eye. This rod is pivoted at its head on one of the clamp bolts 13. The rods 11 and 16 are connected lineally by a turn-buckle 18, by means of which they are drawn toward each other.

The operation will now be described. The members 1 are released sufficiently to be placed about the tree stem or by slipping the stem downwardly through the central clamping parts. The tightening means are then used to secure the tree rigidly in the members 1. The guy clamp 12 is then placed in engagement with the tree stem loosely near its lower end and the guy bracket moved along the member 1 until the rods 11 and 16 are in alignment with the direction in which the upper part of the tree stem is tilted downwardly. The turn buckle is then operated and the lower part of the tree stem is drawn in the same direction, which tends to bring it to a vertical position in the support. It is well known that Christmas trees and the like are difficult to set up in vertical position, either because of their growth not being lineally straight or because of a lack of effective means to straighten them in a supporting holder. My device supplies a support, with clamp, quickly and easily adjustable to the tree stem, also a very simple and easily placed guy clamp, by means of which the lower part of the tree can be quickly drawn to force it to a vertical alignment. The device is new and useful as well as very economical in cost.

I claim:

1. In a tree support, the combination of a pair of semi-circular, upper, horizontally positioned members, each having on one end thereof a short inwardly projecting portion, and each having an integral clamping strap extending horizontally at an angle from a position on the member, opposite to the said projecting portion, thence toward and upon the latter and opposite the base of the opposing member strap, the said straps being curved outwardly in their central parts to form a circular space between them, means to secure the free end of a strap to the said projecting portion and the base of the opposing strap, and means arranged adjacent to the curved parts of the straps in a manner to adapt the means to allow the curved strap parts to be drawn toward each other and rigidly secure them in a position to which thus drawn.

2. In a tree support, the combination of a horizontal, circular support, adapted to be rigidly securable about and in engagement with a tree stem, a guy clamp bracket, slidable upon the support to a radial position, a clamp, adapted to be rigidly secured about and in engagement with a tree stem below said support, and means arranged between and connected respectively with said bracket and clamp to adapt the means to allow the clamp to be drawn toward the bracket and rigidly secured in a position to which drawn.

3. In a tree support, the combination of two related arched members having sectionally positioned straps with centrally disposed clamps therein and supporting legs, means to secure the clamps together and into opposing engagement about and with a tree stem, a guy bracket slidable on the arched members to a radial position, clamp members having means to secure them about and into opposing engagement with a tree stem below the horizontal plane of the rim of said arched members, and means to draw the clamp toward the bracket.

ENOCH CLIFTON.